United States Patent

Moss

[11] Patent Number: 5,836,756
[45] Date of Patent: Nov. 17, 1998

[54] GAS COLLECTOR ELECTRODE ASSEMBLY

[75] Inventor: Russell W. Moss, Richmond Heights, Ohio

[73] Assignee: Channel Products, Inc., Chesterland, Ohio

[21] Appl. No.: 13,251
[22] Filed: Jan. 26, 1998
[51] Int. Cl.[6] ....................................................... F23Q 7/06
[52] U.S. Cl. ......................... 431/263; 126/41 R; 431/264
[58] Field of Search .......................... 126/41 R; 431/263, 431/264, 266

[56] References Cited

U.S. PATENT DOCUMENTS 4,288,210  9/1981  Leonard et al. ......................... 431/263
4,861,264  8/1989  Romanak et al. ..................... 126/41 R Primary Examiner—Carroll B. Dority
Attorney, Agent, or Firm—James A. Hudak

[57] ABSTRACT

A gas collector electrode assembly that is movable within the collector box is disclosed. The electrode assembly includes a first diameter portion which is receivable within the collector box while a second diameter portion thereof is receivable through an aperture provided in the bottom wall of the collector box permitting a circumferential shoulder provided at the juncture of the first diameter portion and the second diameter portion to engage the inner surface defining the bottom wall of the collector box. A coil spring is receivable over the second diameter portion of the electrode assembly and one end thereof contacts the bottom wall of the collector box and the other end thereof is receivable within a circumferential groove provided on the second diameter portion of the electrode assembly causing the electrode assembly to be "spring mounted" within the collector box permitting radial and longitudinal movement thereof within the collector box.

13 Claims, 4 Drawing Sheets

5,836,756

GAS COLLECTOR ELECTRODE ASSEMBLY

TECHNICAL FIELD

The present invention relates generally to a gas collector electrode assembly for a gas grill and, more particularly, to a gas collector electrode assembly that can be easily assembled and/or disassembled and which permits the electrode to be movable therein minimizing the possibility of the fracture thereof when subjected to shock loading.

BACKGROUND ART

Gas grills typically use propane or natural gas as fuel and generally employ an ignition device in order to ignite same. Such an ignition device may include a gas collector electrode assembly and a manually operated piezoelectric transducer which acts as a spark generator. The manually operated piezoelectric transducer is electrically connected to the gas collector electrode assembly and provides the spark which is required to ignite the fuel/air mixture within the gas collector box.

Gas collector boxes have many configurations, depending upon their application, and have an electrode assembly attached thereto and positioned therein such that a spark gap is formed between the tip of the electrode and a surface of the metallic collector box. The electrode is typically retained within a sleeve of ceramic material which acts as an insulator between the electrode and the collector box. The sleeve of ceramic material is typically attached to the collector box by one or more retaining rings. Since retaining rings are utilized, the disassembly of the ceramic insulating sleeve from the collector box is a relatively difficult task. In addition, since one or more retaining rings are typically utilized to attach the sleeve of ceramic material to the collector box, assembly costs are relatively high. This type of assembly is typically done at the factory because of the difficulty that would be encountered by the purchaser when assembling the gas grill. In addition, after the sleeve of ceramic material has been attached to the collector box, there is always the possibility of fracture or breakage of the sleeve during shipping since it is difficult to protect same when in the assembled condition. Furthermore, since the sleeve of ceramic material is firmly attached to the collector box, when the resulting assembly is subjected to shock loading during shipping or after installation in the gas grill, the frequency of sleeve fracture or breakage is quite high.

Because of the foregoing, it has become desirable to develop a simple, inexpensive structure for the gas collector box and the electrode assembly that is attached thereto and which permits the easy assembly and disassembly thereof and minimizes the possible fracture or breakage of the ceramic insulating sleeve during shipping or after installation of the gas collector electrode assembly within a gas grill.

SUMMARY OF THE INVENTION

The present invention solves the problems associated with the prior art gas collector electrode assemblies and other problems by providing a unique approach for attaching the electrode assembly to the gas collector box. The electrode assembly is sized so that a first diameter portion thereof, including the electrode tip, is receivable within the collector box while a second diameter portion thereof is receivable through an aperture provided in the bottom wall of the collector box permitting a circumferential shoulder provided at the juncture of the first diameter portion and the second diameter portion to firmly engage the inner surface of the bottom wall of the collector box. A coil spring is receivable over the second diameter portion of the electrode assembly and one end thereof contacts the outer surface of the bottom wall of the collector box and the other end thereof is receivable within a circumferential groove provided on the second diameter portion of the electrode assembly. In this manner, the electrode assembly is "spring mounted" within the collector box allowing the electrode assembly to be "self-centering" within the collector box and permitting the radial and longitudinal movement thereof within the collector box. By permitting such radial and longitudinal movement of the electrode assembly within the collector box, fracture of the ceramic insulating sleeve for the electrode assembly is minimized when the electrode assembly is subjected to shock loading either during shipping or after installation in the gas grill.

DESCRIPTION OF THE PREFERRED EMBODIMENT

Figure 1:
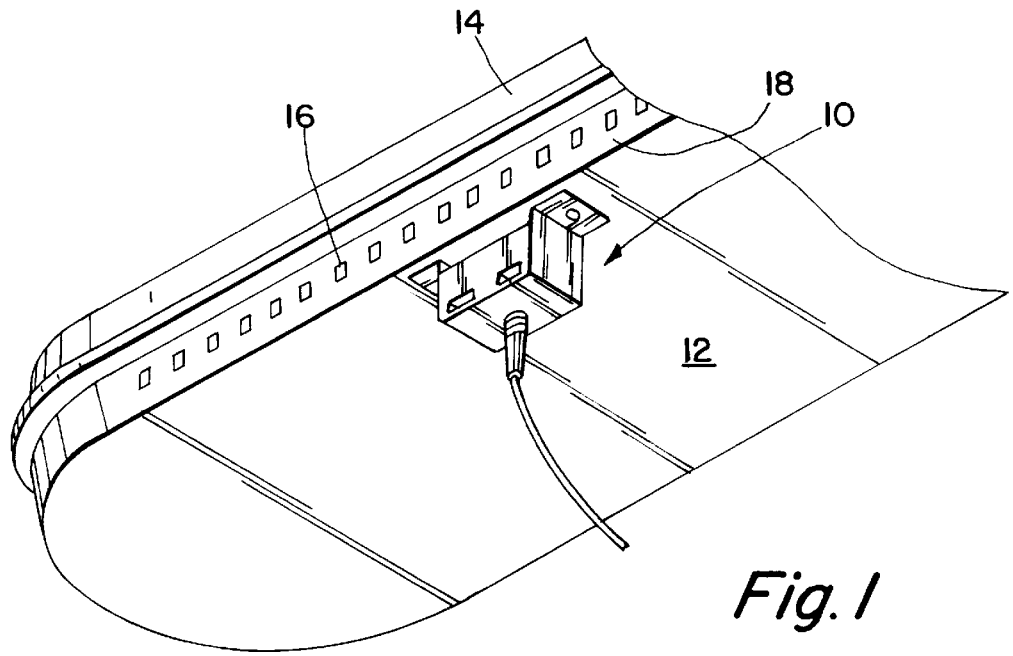
FIG. 1 is a perspective view of the gas collector electrode assembly of the present invention attached to the bottom exterior surface of a gas burner.

Referring now to the drawings where the illustrations are for the purpose of describing the preferred embodiment of the present invention and are not intended to limit the invention described herein, FIG. 1 is a perspective view of the gas collector electrode assembly 10 of the present invention attached to the bottom exterior surface 12 of a gas burner 14 having a plurality of ports 16 positioned along the outer edge 18 thereof adjacent the bottom surface 12 of the burner 14. The gas collector electrode assembly 10 is positioned so as to be adjacent one or more of the ports 16 in the burner 14. The burner 14 can have any of a number of configurations and the configuration shown in FIG. 1 is merely for illustration purposes. Similarly, the ports 16 can have any of a number of configurations and the configuration shown in FIG. 1 is also merely for illustration purposes.

Figure 2:
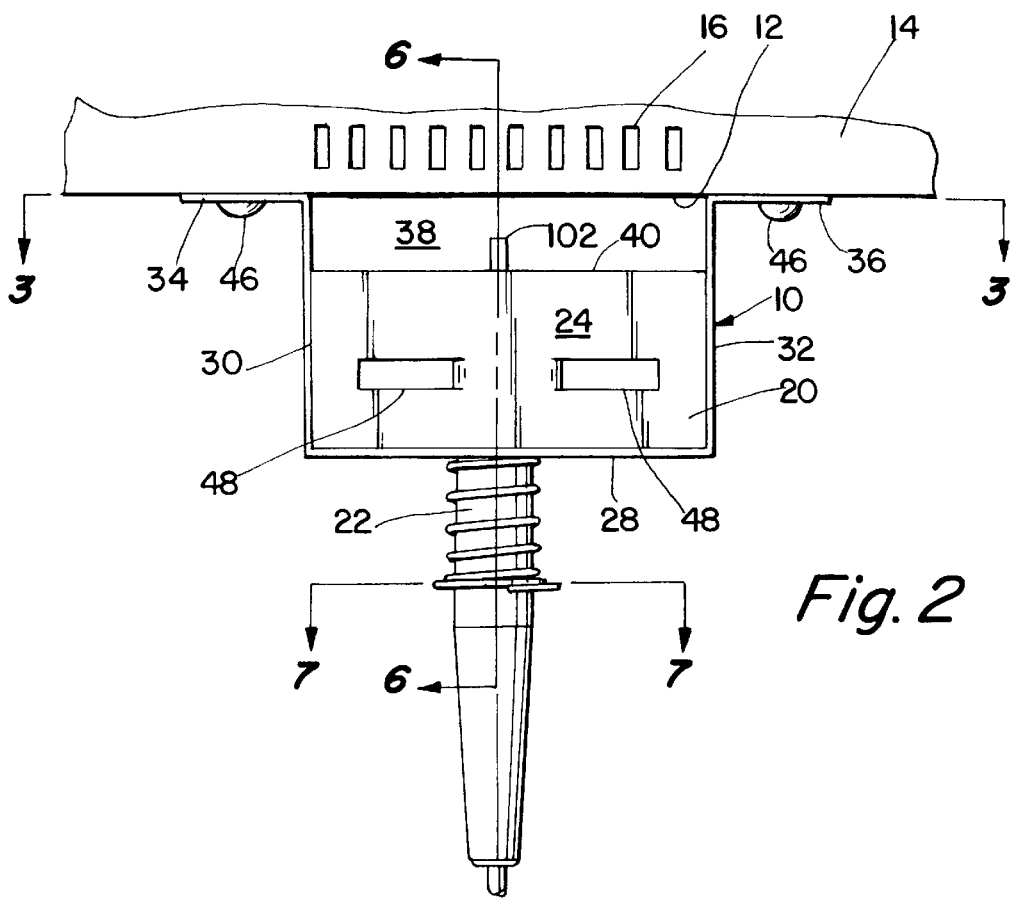
FIG. 2 is a front elevation view of the gas collector electrode assembly of the present invention and a portion of a gas burner to which it is attached.
Figure 3:
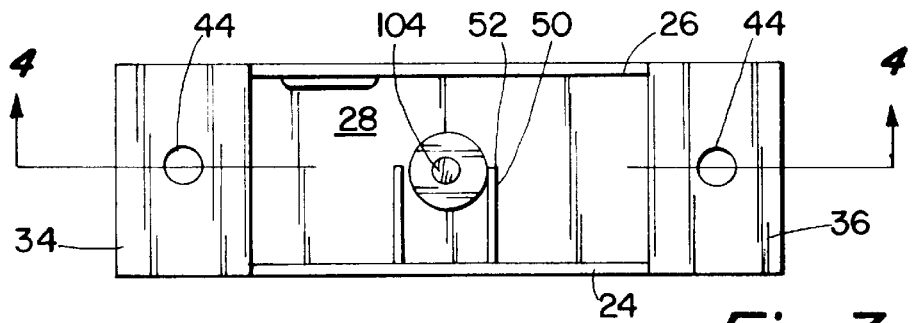
FIG. 3 is a cross-sectional view of the gas collector electrode assembly of the present invention and taken across section-indicating lines 3—3 in FIG. 2.
Figure 4:
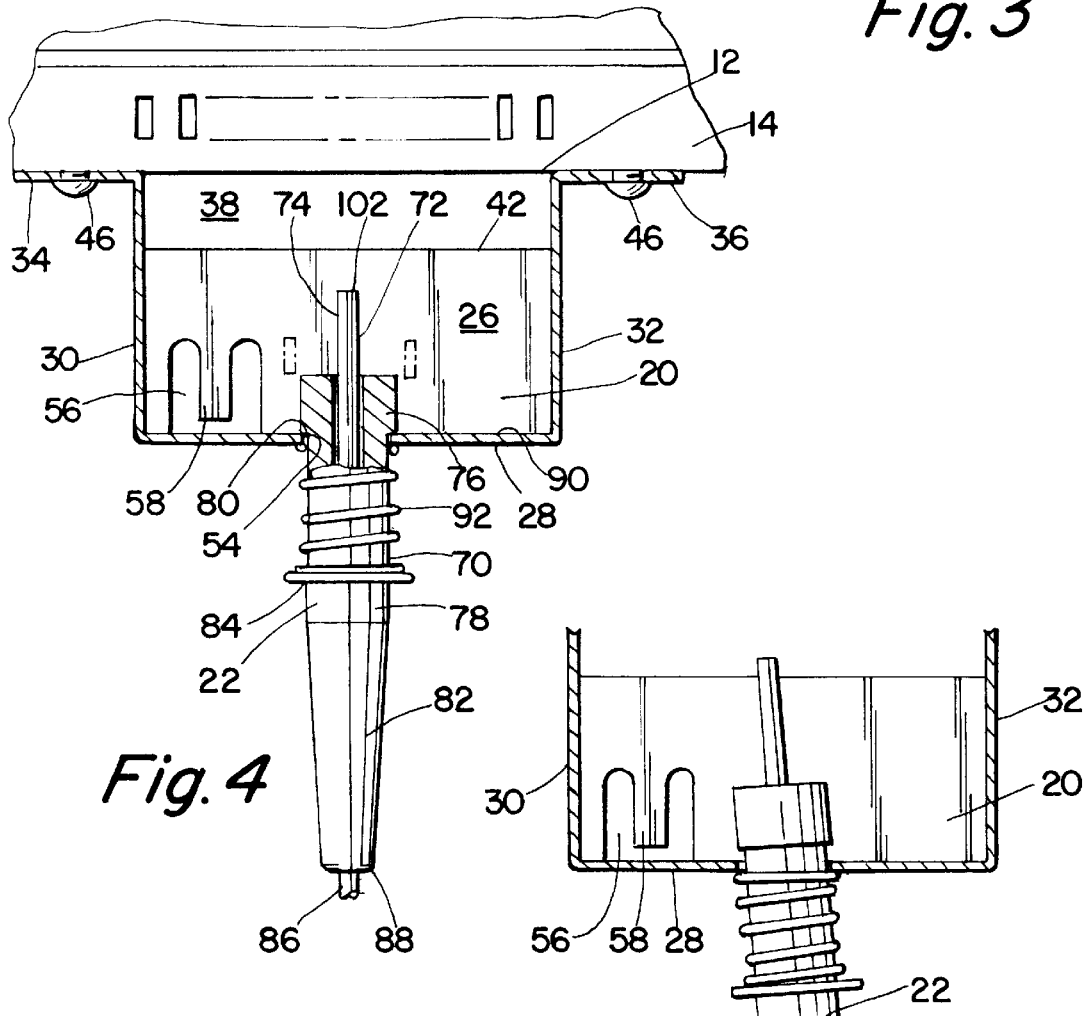
FIG. 4 is a cross-sectional view of the gas collector electrode assembly of the present invention and taken across section-indicating lines 4—4 in FIG. 3.

Referring now to FIG. 2, which is a front elevation view of the gas collector electrode assembly 10 of the present invention and a portion of the gas burner 14, the gas collector electrode assembly 10 is comprised of a gas collector box 20 and an electrode assembly 22. The gas collector box 20 is formed from sheet metal and includes a front wall 24, a rear wall 26, a bottom wall 28 which connects the bottom of the front wall 24 with the bottom of the rear wall 26, a left side wall 30 and a right side wall 32. The bottom of the left side wall 30 and the bottom of the right side wall 32 are attached to the bottom wall 28 of the collector box 20. The left side wall 30 and the right side wall 32 each terminate in oppositely directed outwardly extending mounting flanges 34 and 36, respectively. The length (height) of the left side wall 30 and the length (height) of the right side wall 32 are each greater than the length (height) of the front wall 24 and the length (height) of the rear wall 26 so as to provide an air gap, shown generally by the numeral 38, between the top edge 40 of the front wall 24 and the bottom surface 12 of the gas burner 14 and between the top edge 42 of the rear wall 26 and the bottom surface 12 of the gas burner 14. An aperture 44 is provided in the approximate center of each of the outwardly extending mounting flanges 34, 36 and a fastener 46 is received through each of the apertures 44 to fasten the gas collector electrode assembly 10 to the bottom surface 12 of the gas burner 14. Two spaced-apart, laterally-extending, substantially rectangular slots 48 are provided in the front wall 24 of the collector box 20 causing the sheet metal thereat to be bent inwardly, as shown in FIG. 3, forming inwardly-directed, substantially parallel tabs 50. The resulting length of each tab 50 is approximately one half (½) of the width of the bottom wall 28 of the collector box 20. The ends 52 of the tabs 50 are adjacent the approximate center of the bottom wall 28 of the collector box 20. An aperture 54, as shown in FIG. 4, is provided in the approximate center of the bottom wall 28 of the collector box 20. A U-shaped slot 56 is provided in the rear wall 26 of the collector box 20 and is positioned such that the bottom of the slot 56 is adjacent the bottom wall 28 of the collector box 20. The U-shaped slot 56 forms a tab 58 for the attachment of an electrical conductor (not shown) which provides a ground connection to the gas collector electrode assembly 10.

As shown in FIG. 4, the electrode assembly 22 is comprised of a sleeve 70 of ceramic or other suitable high temperature resistant electrical insulating material with a metallic electrode 72 passing therethrough and having its outer end 74 projecting therefrom. The sleeve 70 is comprised of a first diameter portion 76, a second diameter portion 78 with a circumferential shoulder 80 at their juncture and a tapered portion 82. The diameter of the first diameter portion 76 is slightly larger than the diameter of aperture 54 in bottom wall 28 of collector box 20, whereas the diameter of the second diameter portion 78 and the tapered portion 82 are slightly less than the diameter of aperture 54 in the aforementioned bottom wall 28. A circumferential groove 84 is provided in second diameter portion 78 of sleeve 70 and is positioned therein so as to be in a spaced apart relationship with circumferential shoulder 80. An electrical conductor 86 is attached to the opposite end 88 of the metallic electrode 72 and is sheathed in a high temperature resistant insulating material. The conductor 86 is attached to an electromechanical transducer, such as a piezoelectric transducer (not shown), having some type of actuating means attached thereto.

Figure 7:
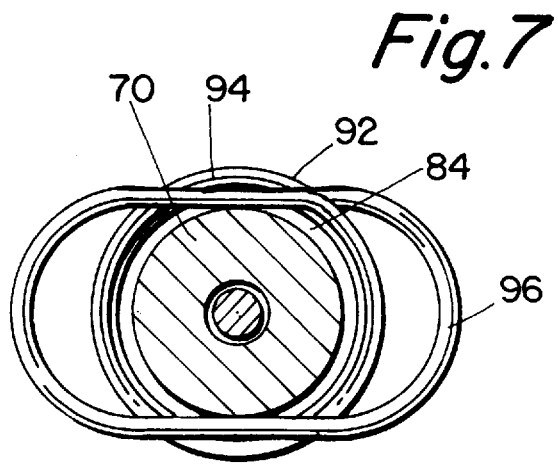
FIG. 7 is a cross-sectional view taken across section-indicating lines 7—7 in FIG. 2 showing the spring utilized to mount the electrode assembly to the collector box and the receipt of one end thereof within a circumferential groove provided on the sleeve of the electrode assembly.

In order to assemble the gas collector electrode assembly 10, the second diameter portion 78 and the tapered portion 82 of the sleeve 70 of the electrode assembly 22 are received through the aperture 54 in the bottom wall 28 of the collector box 20 and is positioned therein so that circumferential shoulder 80 on the sleeve 70 contacts the inner surface 90 of the bottom wall 28 of the collector box 20. A spring 92 having a coiled portion 94 terminating in a formed end 96 is utilized to secure the electrode assembly 22 within the collector box 20. The inner diameter of the coiled portion 94 of spring 92 is slightly greater than the outer diameter of second diameter portion 78 and tapered portion 82 of sleeve 70 of electrode assembly 22. The formed end 96 of spring 92 is configured and sized so as to be less than the diameter of the second diameter portion 78 of sleeve 70 and to approximate the root diameter of circumferential groove 84 in sleeve 70 permitting the formed end 96 of spring 92 to be received in groove 84. The overall free length of the spring 92 is somewhat greater than the axial distance between the circumferential shoulder 80 and the circumferential groove 84 in the sleeve 70 resulting in the spring 92 being somewhat compressed when in the installed condition. Once the tapered portion 82 and second diameter portion 78 of the sleeve 70 of the electrode assembly 22 are received through the aperture 54 in the bottom wall 28 of the collector box 20, the spring 92 is received over the electrical conductor 86, the tapered portion 82 and the second diameter portion 78 of the sleeve 70 so that end 98 of spring 90 is adjacent the outer surface 100 of the bottom wall 28 of the collector box 20. The spring 92 is then compressed so that formed end 96 thereof is received within circumferential groove 84 on sleeve 70, as shown in FIG. 7.

Figure 8:
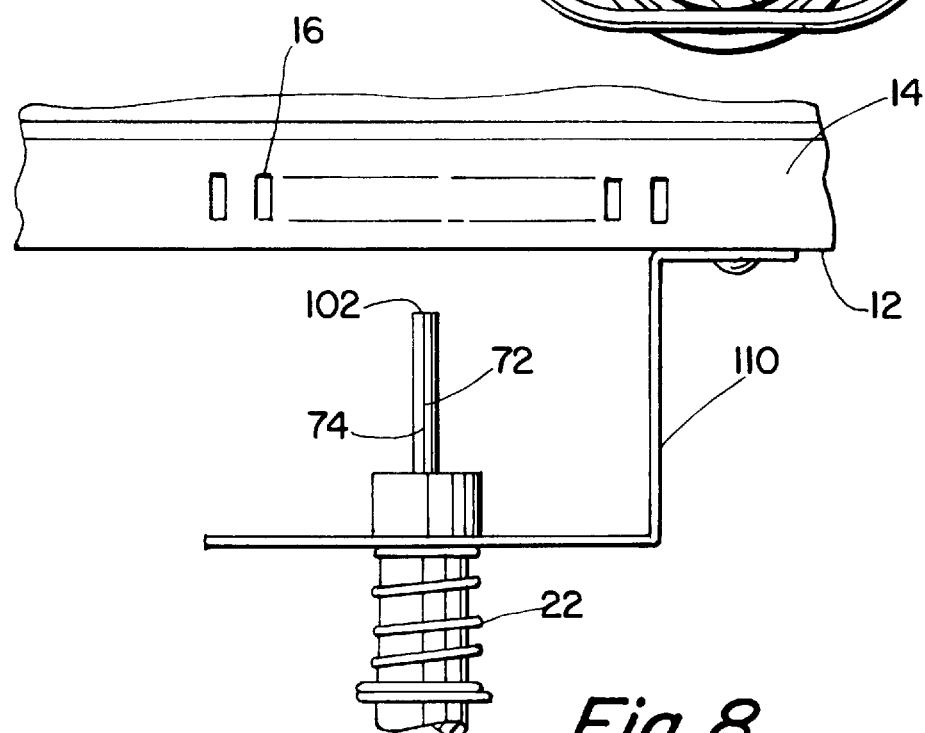
FIG. 8 is a partial cross-sectional front elevation view of the electrode assembly of the present invention showing its attachment to the bottom surface of a gas burner by means of a bracket, rather than by the utilization of a collector box.
Figure 9:
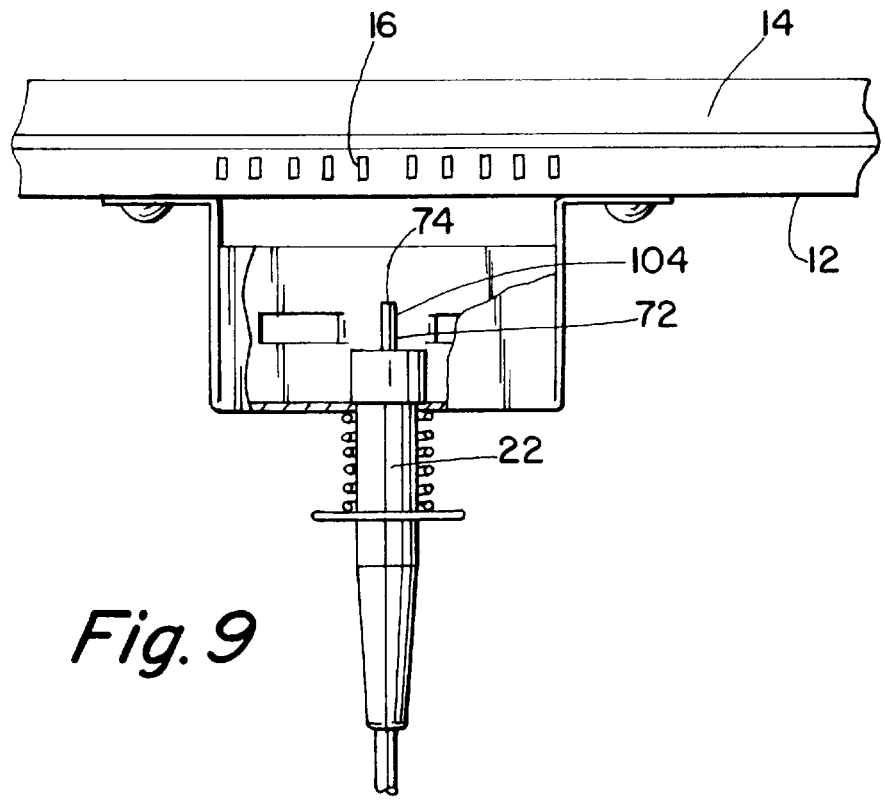
FIG. 9 is a partial cross-sectional front elevation view of another embodiment of the gas collector electrode assembly of the present invention attached to the bottom surface of a gas burner.
Figure 10:
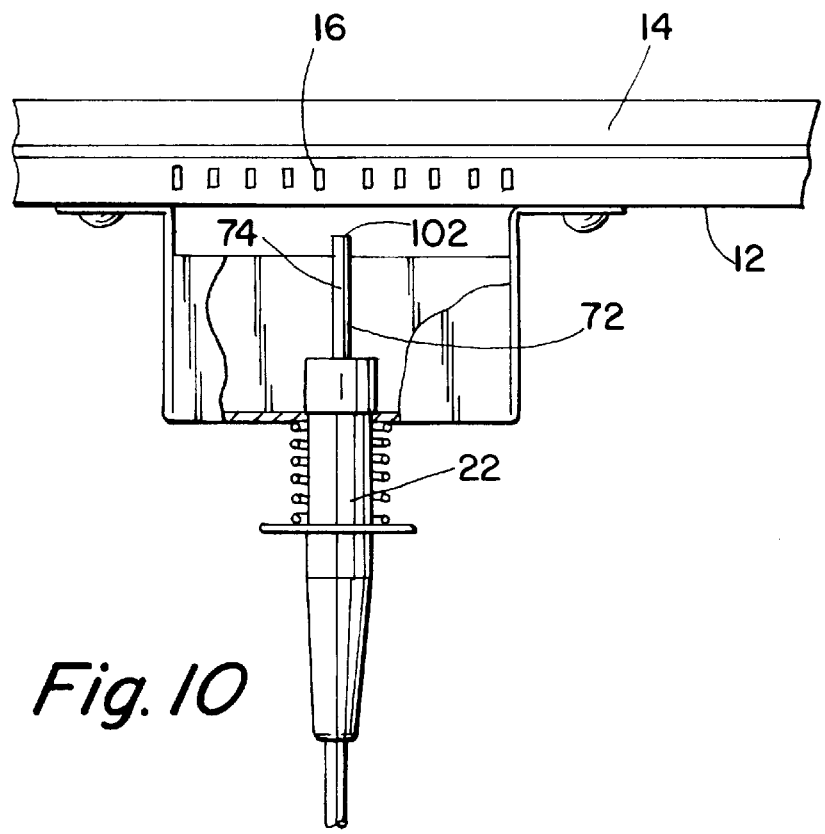
FIG. 10 is a partial cross-sectional front elevation view of still another embodiment of the gas collector electrode assembly of the present invention attached to the bottom surface of a gas burner.

The axial length of outer end 74 of electrode 72 is such so as to provide a spark gap between its tip 102 and the bottom surface 12 of the gas burner 14, as shown in FIG. 4, and between its axially extending sides, shown generally by the numeral 104, and the inwardly directed tabs 50. As shown in FIG. 9, the outer end 74 of electrode 72 can be shortened so that spark gaps exist only between the axially extending sides 104 and the inwardly directed tabs 50. Conversely, the tabs 50 can be eliminated, as shown in FIG. 10, and by utilizing a longer outer end 74 for electrode 72, as in the first embodiment, the spark gap is limited to the gap between the tip 102 of electrode 72 and the bottom surface 12 of gas burner 14. Alternatively, the collector box 20 can be replaced with a mounting bracket 110 having an aperture therein for the receipt of the electrode assembly 22, as shown in FIG. 8. In this case, only one spark gap is present between the tip 102 of the electrode 72 and the bottom surface 12 of the gas burner 14, as in the embodiment shown in FIG. 10.

In operation, regardless of the number of spark gaps utilized, gas emanating from the ports 16 of the gas burner 14 pass through the air gap 38 between the top edge 40 of the front wall 24 of the collector box 20 and are ignited therein by the actuation of a piezoelectric ignitor (not shown), or the like, which causes a spark to "jump across" the spark gap between the tip 102 of the electrode 72 and the bottom surface 12 of the gas burner 14 or between the axially extending sides 104 of the electrode 72 and the tabs 50 or between the tip 102 of the electrode 72 and the bottom surface 12 of the gas burner 14 and between the sides 104 of the electrode 72 and the tabs 50. Ignition of the gas within the gas collector box 20 causes the gas from the ports 16 to be immediately ignited.

Figure 5:
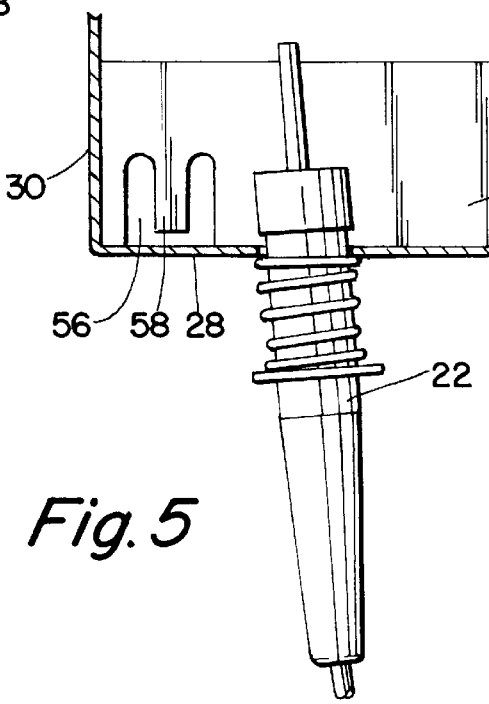
FIG. 5 is a partial cross-sectional front elevation view of the gas collector electrode assembly of the present invention showing the electrode assembly in a radially and longitudinally offset position with respect to the collector box.
Figure 6:
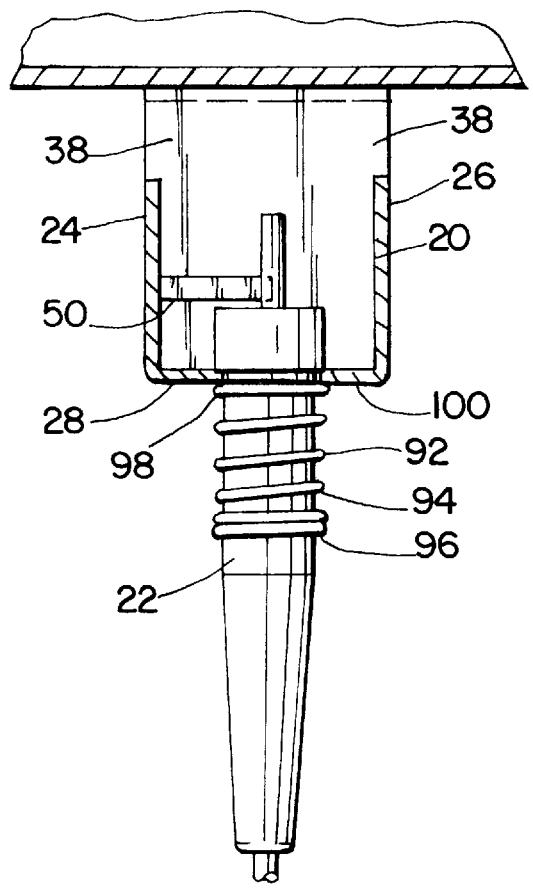
FIG. 6 is a partial cross-sectional view of the gas collector electrode assembly of the present invention and taken across section-indicating lines 6—6 in FIG. 2.

The gas collector electrode assembly 10 of the present invention provides a number of advantages over the prior art gas collector electrode assemblies. For example, the gas collector electrode assembly 10 can be supplied in an unassembled state minimizing the breakage or fracture of the electrode assembly 22 during shipping. In addition, the gas collector electrode assembly 10 can be easily assembled in the field and disassembled for cleaning purposes. Furthermore, since the electrode assembly 22 is "spring mounted" within the collector box 20, radial and longitudinal movement of the electrode assembly 22 within the collector box 20, as illustrated in FIG. 5, can readily occur minimizing any breakage of the ceramic insulating sleeve 70 due to any "shock loading" of the gas collector electrode assembly 10. In addition, because of the utilization of a spring to "spring mount" the electrode assembly 22 within the collector box 20, self centering of the electrode assembly 22 within the collector box 20 occurs, thus maintaining the resulting spark gaps for ignition purposes. Lastly, the resulting spring mounting of the electrode assembly 22 within the collector box 20 utilizes a minimum of components and is very inexpensive to produce.

Certain modifications and improvements will occur to those skilled in the art upon reading the foregoing. It should be understood that all such modifications and improvements have been deleted herein for the sake of conciseness and readability, but are properly within the scope of the following claims.

I claim:

1. A gas collector electrode assembly utilized in gas burner applications comprising a mounting member having an aperture therein, said mounting member being operatively attached to the gas burner, a spark electrode assembly receivable within said aperture in said mounting member and positioned therein so that a portion of said spark electrode assembly is adjacent the gas burner, and means for biasing said spark electrode assembly with respect to said mounting member permitting radial and longitudinal movement of said spark electrode assembly within said mounting member.

2. The apparatus as defined in claim 1 wherein said spark electrode assembly comprises a first diameter portion and a second diameter portion forming a circumferential shoulder at the junction between same, said first diameter portion having a diameter greater than said second diameter portion and greater than said aperture in said mounting member, said second diameter portion having a diameter less than the diameter of said aperture in said mounting member permitting said spark electrode assembly to be receivable within said aperture and allowing said circumferential shoulder to contact said mounting member.

3. The apparatus as defined in claim 2 wherein said second diameter portion of said spark electrode assembly is received within said biasing means and is positioned therein so that one end of said biasing means contacts said mounting member and the other end thereof engages said spark electrode assembly.

4. The apparatus as defined in claim 3 wherein said second diameter portion of said spark electrode assembly includes a circumferential groove, said other end of said biasing means being receivable within said circumferential groove.

5. The apparatus as defined in claim I wherein said biasing means is a spring.

6. The apparatus as defined in claim 2 wherein said spark electrode assembly includes a tapered portion positioned thereon so that said second diameter portion of said spark electrode assembly is interposed between said first diameter portion and said tapered portion of said spark electrode assembly.

7. The apparatus as defined in claim 6 wherein said tapered portion of said spark electrode assembly provides a lead-in surface for said spark electrode assembly when received within said aperture in said mounting member.

8. The apparatus as defined in claim 1 wherein said mounting member is a housing having spaced-apart walls.

9. The apparatus as defined in claim 8 wherein said housing includes at least one inwardly directed tab through a wall thereof and positioned so as to be in a spaced-apart relationship with respect to said spark electrode assembly.

10. The apparatus as defined in claim 9 wherein the end of said spark electrode assembly and the gas burner form a spark gap therebetween and said at least one inwardly directed tab and said spark electrode assembly form a spark gap therebetween.

11. The apparatus as defined in claim 9 wherein said spark electrode assembly and said at least one inwardly directed tab form a spark gap therebetween.

12. The apparatus as defined in claim 1 wherein said mounting member is a bracket.

13. The apparatus as defined in claim 1 wherein the end of said spark electrode assembly and the gas burner form a spark gap therebetween.

\* \* \* \* \*